United States Patent [19]
Gibbons et al.

[11] Patent Number: 5,870,752
[45] Date of Patent: Feb. 9, 1999

[54] INCREMENTAL MAINTENANCE OF AN APPROXIMATE HISTOGRAM IN A DATABASE SYSTEM

[75] Inventors: Phillip B. Gibbons, Westfield, N.J.; Yossi Matias, Tel Aviv, Israel; Viswanath Poosala, Highland Park, N.J.; Andrew Witkowski, Foster City, Calif.

[73] Assignees: Lucent Technologies Inc., Murray Hill, N.J.; NCR Corporation, Dayton, Ohio

[21] Appl. No.: 915,804

[22] Filed: Aug. 21, 1997

[51] Int. Cl.$^6$ .................................................. G06F 17/30
[52] U.S. Cl. ........................ 707/102; 707/101; 707/104
[58] Field of Search .................................. 707/1, 2, 3, 4, 707/5, 6, 7, 8, 9, 10, 100, 101, 102, 103, 104; 382/212; 702/181; 705/10; 364/962, 963

[56] References Cited

U.S. PATENT DOCUMENTS

| | | | |
|---|---|---|---|
| 4,956,774 | 9/1990 | Shibamiya et al. | 707/2 |
| 5,542,089 | 7/1996 | Lindsay et al. | 707/2 |
| 5,630,120 | 5/1997 | Vachey | 707/2 |
| 5,675,786 | 10/1997 | McKee et al. | 707/103 |
| 5,689,696 | 11/1997 | Gibbons et al. | 707/1 |
| 5,692,171 | 11/1997 | Andres | 707/2 |

OTHER PUBLICATIONS

V. Poosala, Y. Ioannidis, P. Haas and E. Shekita, "Improved histograms for selectivity estimation of range predicates," Proc. of ACM Sigmod Conf., pp. 294–305, Jun. 1996.

N.Ramesh et al., Thresholding based on histogram approximation, IEE Proc.–Vis.Image Signal Process;I vol. 142, No. 5, 271–279, Oct. 1995.

Prasanna K. Sahoo et al., Threshold selection based on histogram modeling, IEEE 1992 and 351–356, Aug. 1992.

Yannis E.Ioannidis et al., Optimal Histograms for Limiting Worst–Case Error Propagation in the Size of Join Results, ACM Transactions on Database Systems, vol. 18, No. 4, and 709–748, Dec. 1993.

Viswanath Poosala et al., Balancing Histogram Optimality and Practicality for Query Result Size Estimation, ACM Sigmod 1995 and 233–244, Jun. 1995.

*Primary Examiner*—Wayne Amsbury
*Assistant Examiner*—Srirama Channavajjala

[57] ABSTRACT

Techniques for maintaining an approximate histogram of a relation in a database, in the presence of updates to the relation. The histogram includes a number of subsets, or "buckets," each representing at least one possible value of an attribute of the relation. Each of the subsets has a count associated therewith indicative of the frequency of occurrence of the corresponding value of the attribute. After an update to the relation, the counts associated with the subsets are compared to a threshold. If the count associated with a given subset exceeds the threshold, the given subset is separated at its median into two separate subsets. After the separation operation, the two subsets with the lowest counts are combined such that a constant number of subsets are maintained in the histogram, if the total combined count of the subsets does not exceed the threshold. If no two subsets have a total combined count which does not exceed the threshold, the histogram is recomputed from a random sample of the relation. The invention substantially reduces the number of times the histogram must be recomputed from the random sample, and is particularly well-suited for use with approximate equi-depth and compressed histograms.

26 Claims, 4 Drawing Sheets

INCREMENTAL MAINTENANCE OF AN APPROXIMATE HISTOGRAM IN A DATABASE SYSTEM

FIELD OF THE INVENTION

The invention relates generally to database management techniques, and more particularly to techniques for maintaining a histogram for attribute values of one or more relations stored in a database system, in the presence of updates to the relations.

BACKGROUND OF THE INVENTION

Databases store large amounts of data in the form of "relations," which may be viewed as tables of data items. The size of a given relation may be on the order of several megabytes to several gigabytes or more, depending on the application. A relation stores the data items, which are also referred to as records or "tuples," in a predetermined format. For example, a relation in a database of bank customers may be structured to hold categories of information such as customer name, account number, account balances and the like. Each category is referred to as an "attribute" of the relation. The particular values entered in the attribute of a relation for a given customer constitute tuples of that relation. In many applications, relations are continuously updated as tuples are inserted, deleted or modified during normal operation of the database. A database management system (DBMS) is used to manage these updates as well as other database operations, such as query processing, evaluation and optimization.

It is often desirable for a given DBMS to be able to estimate the characteristics of database relations. For example, query optimizers of most relational database systems decide on the most efficient access plan for a given query based on estimates of the intermediate result sizes of queries and the costs of executing various plans, as described in P. Selinger, M. Astrahan, D. Chamberlin, R. Lorie and T. Price, "Access path selection in a relational database management system," Proc. of ACM SIGMOD Conf., pp. 23–34, 1979. Also, quick estimates of query result characteristics can be useful to a user during query design and in providing approximate answers to queries, as described in, for example, J. M. Hellerstein, P. J. Haas and H. J. Wang, "Online aggregation," Proc. of ACM SIGMOD Conf., 1997.

Most DBMSs therefore maintain a variety of statistics on the contents of database relations in order to perform various estimations. These statistics usually take the form of approximations of the distributions of particular data values in attributes of the relations. Since the statistics are used to estimate the values of several parameters of interest to optimizers, the validity of the optimizer's decisions may be affected by the quality of these approximations, as described in S. Christodoulakis, "Implications of certain assumptions in database performance evaluation," ACM TODS, 9(2): 163–186, June 1984. In fact, it has been established in Y. Ioannidis and S. Christodoulakis, "On the propagation of errors in the size of join results," Proc. of ACM SIGMOD Conf., pp. 268–277, 1991, that selectivity estimation errors propagate exponentially with the number of operators in the query and hence will ultimately result in a poor-quality plan being chosen by the optimizer. This is becoming very important in the context of increasingly complex queries, such as decision support and data analysis queries.

A commonly-used technique for selectivity estimation involves maintaining histograms on the frequency distribution of an attribute. A histogram groups attribute values into subsets, referred to as "buckets," and approximates true attribute values and their frequency distributions based on summary statistics maintained in each bucket. Since histograms are just summaries of actual, much larger distributions, any estimations based on histograms may still incur errors. Nonetheless, for most real-world databases, there exist histograms that produce acceptable low-error estimates while occupying reasonably small space, which may be on the order of only hundreds of bytes. Histograms are used in conventional DBMSs such as DB2, Informix, Ingres, and Microsoft SQL Server, as well as in other DBMSs from Oracle, Sybase, and Teradata. Histograms are also being used to provide various estimates in other database management applications, such as parallel join load balancing, as described in V. Poosala and Y. Ioannidis, "Estimation of query-result distribution and its application in parallel-join load balancing," Proc. of the $22^{nd}$ Int. Conf. on Very Large Databases, September, 1996, which is incorporated by reference herein.

Histograms are usually precomputed on the underlying data and used without much additional overhead inside the query optimizer. A significant drawback of using precomputed histograms is that they may get outdated when the data in the database is modified, and hence introduce significant errors in estimations. On the other hand, it is clearly impractical to compute histograms after every update to the database. Fortunately, it is often not necessary to keep the histograms perfectly up-to-date at all times, because they are used only to provide reasonably accurate estimates. Instead, one needs appropriate techniques for propagating updates to histograms, so that the database performance is not affected. Despite the popularity of histograms, many important issues related to their maintenance have not been adequately addressed.

A typical conventional histogram maintenance approach, which is followed in a substantial number of commercial database systems, involves recomputing histograms periodically (e.g., every night). This periodic recomputation approach has at least two serious disadvantages. First, any significant updates to the database between two successive recomputations could cause poor estimations inside a query optimizer. Second, since the old histograms are discarded and new histograms are recomputed, the recomputation phase for the entire database is computationally very intensive. Other conventional histogram maintenance techniques focus on proper bucketizations of values in order to enhance the accuracy of the histograms, and generally assume that the database is not being modified. Although efficient sampling-based methods are available to construct various histograms, these methods also generally ignore the problem of histogram maintenance. With the increasing use of histograms in multiple components of a DBMS, some of which (e.g., user interfaces) may have even higher accuracy requirements on estimates than query optimizers, it has become very important to identify more efficient techniques for maintaining histograms.

SUMMARY OF THE INVENTION

The invention provides techniques for incremental maintenance of approximate histograms. A given histogram arranges attribute values into a number of subsets also referred to as "buckets." A count associated with each bucket reflects the frequency of occurrence of a particular attribute value in a database relation. The invention monitors the counts associated with each bucket in the histogram in the presence of updates to the database. A given bucket which has a count exceeding a threshold is separated at its median into two buckets, and two buckets having the lowest counts are then merged to form a single bucket. This split and merge process maintains the bucket sizes within suitable limits in the presence of updates, and ensures that the histogram continues to provide an accurate estimate of the corresponding database relation. The process is designed to avoid the need to access a sample of the relation to recompute the histogram, and thus also avoids the computational overhead associated with conventional periodic recomputation.

The histogram maintenance techniques of the invention are particularly well-suited for use in maintaining equi-depth histograms and compressed histograms, both of which are used in commercial database systems, but the techniques can be applied to other classes of histograms as well. The invention can handle all forms of updates to a database, including insert, delete, and modify operations, and is efficient in insert-intensive environments as well as in data warehousing environments that house transactional information for sliding time windows. The histogram maintenance techniques need only access the relation in a secondary or disk-based memory if the size of the relation has, for example, shrunk dramatically due to deleting half the tuples in the relation. The techniques of the invention provide orders of magnitude more accurate estimation than previous approaches, and can keep approximate histograms up-to-date at all times using a relatively small amount of storage and processor resources.

DETAILED DESCRIPTION OF THE INVENTION

The present invention will be illustrated below in conjunction with exemplary database systems. It should be understood, however, that the invention is not limited to use with any particular type of database system or configuration, but is instead more generally applicable to any data storage application in which it is desirable to provide efficient incremental maintenance of a histogram in the presence of updates. Moreover, although the performance advantages of the invention are illustrated in the context of query optimizers, the results are also applicable to other database management areas as well. A "relation" refers to a set of associated data stored in a database or other storage device. An "attribute" of a relation refers to a specific category of data in the relation. The term "tuple" as used herein refers to a particular data item or record to be stored in a table or other type of relation. The term "database system" should be understood to include any type of system in which tuples are stored or processed in one or more physical locations. The term "backing sample" is intended to include any type of random sample of a relation or other set of data in a database.

Figure 1:
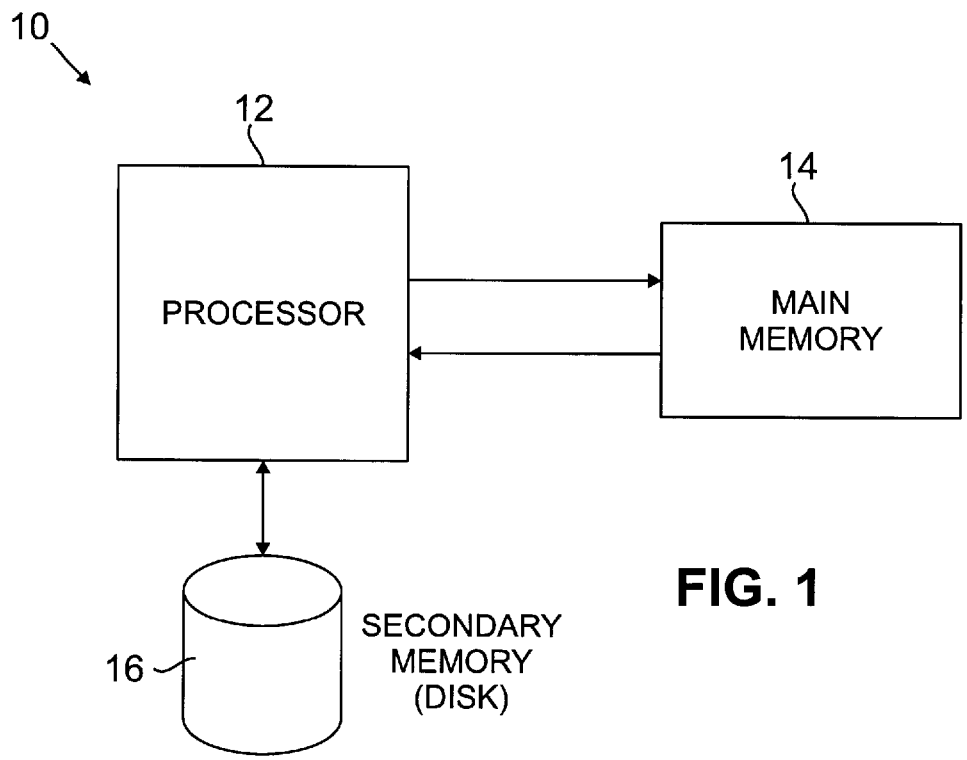
FIG. 1 shows an exemplary database system in which the histogram maintenance techniques of the present invention may be implemented.

FIG. 1 shows an exemplary database system 10 in which incremental maintenance of a histogram may be implemented in accordance with the invention. The system 10 includes a processor 12 connected to communicate with a main memory 14 and a secondary memory 16. The processor 12 can be implemented as a personal, micro or mainframe computer, a workstation, a microprocessor, a central processing unit, an application-specific integrated circuit (ASIC) or other digital data processor, as well as various portions or combinations thereof. The main memory 14 is typically an electronic memory associated with the processor 12. The secondary memory 16 is typically an external magnetic or optical disk-based memory, but may also be a magnetic tape memory, an electronic memory, or other suitable data storage device. The main and secondary memories of the system 10 may represent storage locations of data warehouses, data marts or other large databases having storage capacities of up to a few terabytes, smaller localized database memories, or even memories associated with desktop or portable computers.

The histogram maintenance techniques of the invention, which will be described in greater detail below, may be implemented as a software program stored in portions of one or both of the memories 14 and 16, and executed by processor 12. The software program may be configured to generate and maintain a histogram for a database or databases associated with one or both of the memories 14 and 16. The system 10 may also utilize processor 12 and memories 14, 16 to provide conventional database processing capabilities such as those described in, for example, H. F. Korth and A. Silberschatz, "Database System Concepts," Second Edition, McGraw-Hill, New York, 1991, and R. Elmasri and S. B. Navathe, "Fundamentals of Database Systems," Benjamin/Cummings, Redwood City, Calif., 1989, both of which are incorporated by reference herein.

Figure 2:
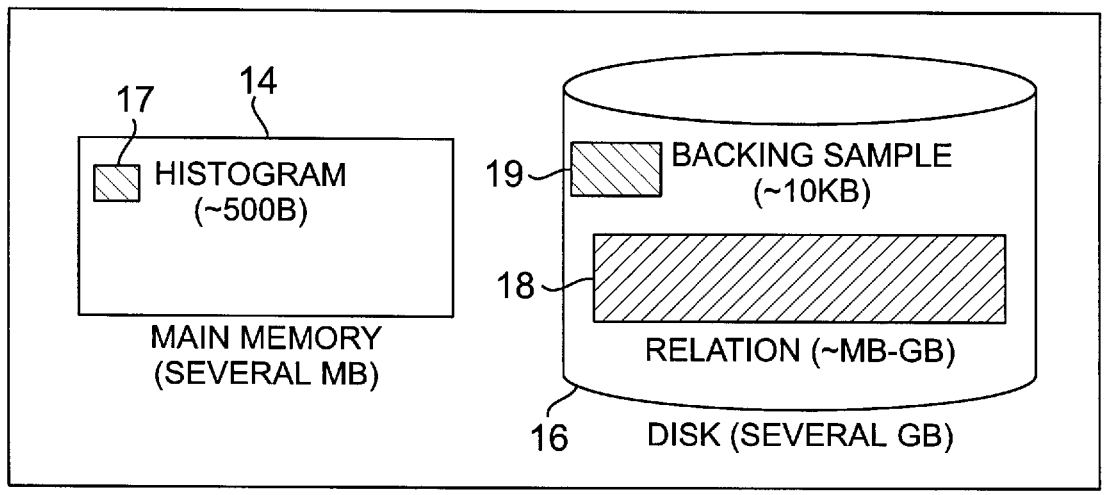
FIG. 2 illustrates the relative size of a relation, a histogram and a random "backing" sample in an exemplary embodiment of the invention.

FIG. 2 illustrates the relative sizes of a histogram, backing sample and relation in an exemplary embodiment of the invention. In this embodiment, a histogram 17 is stored in the main memory 14 of system 10. The main memory 14 has a storage capacity on the order of several megabytes (MB), while the histogram 17 occupies only about 500 bytes. As noted above, a histogram groups attribute values of a database relation into subsets, referred to as "buckets," and approximates true attribute values and their frequency distributions based on summary statistics maintained in each bucket. Histograms produce acceptable low-error estimates of the data in a given relation, while occupying a very small storage space. The secondary memory 16 in this embodiment is a disk which stores a relation 18 and a backing sample 19 which characterizes the relation 18. The secondary memory 16 has a storage capacity on the order of several gigabytes (GB). The relation 18 occupies a space which may be on the order of a few megabytes to a gigabyte or more, while the backing sample 19 of the relation 18 occupies only about 10 kilobytes. The backing sample 19 represents a random sample of the relation 18, and may be maintained in the presence of updates to the relation using the techniques described in U.S. Patent Application of P. Gibbons, Y. Matias and V. Poosala entitled "Incremental Maintenance of a Random Sample of a Relation in a Database System." It should be emphasized that the sizes of the various elements of FIG. 2 are illustrative only, and should not be construed as limiting the invention to any particular application. Moreover, although the histogram is shown in FIG. 2 as stored in the primary memory 14, the histogram could be stored in the secondary or disk-based memory 16 in other embodiments.

Figure 3:
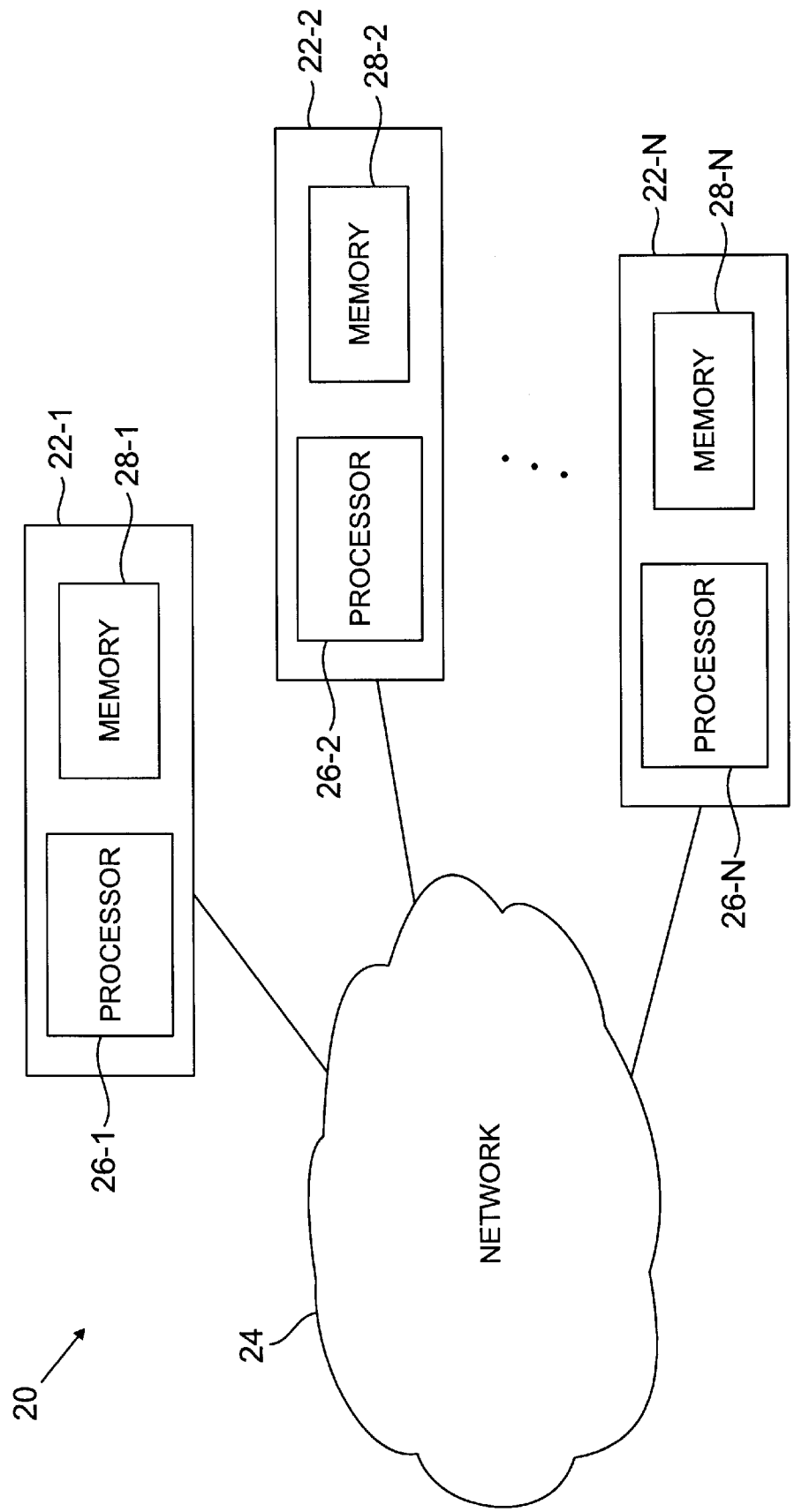
FIG. 3 shows a distributed database system in which in which the histogram maintenance techniques of the present invention may be implemented.

FIG. 3 shows an exemplary distributed database system 20 in which the histogram maintenance techniques of the invention may be implemented. The system 20 includes N physical sites 22-$i$, $i$=1, 2, ... N connected by a network 24. The network 24 may be a local area network, a metropolitan area network, a wide area network, a global data communications network such as the Internet, a private "intranet" network or any other suitable data communication medium. The sites 22-$i$ may be centralized database systems such as data warehouses or data marts, remote customer sites such as automatic teller machines or desktop personal computers, portable computers or other mobile computing devices, or any other type of data processors. Each of the N sites 22-$i$ includes a processor 26-$i$ and a memory 28-$i$. The memory 28-$i$ may be, for example, a large centralized database system, or a memory of a desktop or portable personal, depending upon the nature of the corresponding physical site 22-$i$. One or more of the memories 28-$i$ may be configured to include both a primary memory 14 and a secondary memory 16 as shown in FIG. 1. The processors 26-$i$ may each run a local database management system (DBMS). Like the processor 12 of FIG. 1, the processors 26-$i$ can be implemented as personal, micro or mainframe computers, workstations, microprocessors, central processing units, ASICs or other digital data processors, as well as various portions or combinations thereof.

The memories 28-$i$ may utilize electronic, magnetic or optical storage media, or various combinations thereof, and as previously noted may represent storage locations of data warehouses or data marts having storage capacities of up to a few terabytes, or memories of desktop or portable computers. The storage and retrieval of data items from a memory 28-$i$ of a given site 22-$i$ is controlled by the corresponding processor 26-$i$ using the local DBMS. The sites 22-$i$ of system 20 may each run multiple transactions, such as read and write transactions, during which data items stored at other sites are accessed and processed in accordance with insert, delete and modify operations. One or more of the sites 22-$i$ of FIG. 1B may execute a software program which generates and maintains histograms of database relations in a database or databases associated with one or more of the memories 28-$i$.

An "approximate histogram" in accordance with the invention is an estimated distribution of attribute values for a given database relation, which can be maintained in the presence of updates to the relation. As noted above, histograms are typically used to summarize the contents of large relations and to permit efficient estimation of, for example, query result sizes for use in query optimizers. After any update to a relation, the corresponding histograms generally need to be updated as well. Delaying the propagation of database updates to the histogram may introduce errors in the estimation. In conventional database systems, histograms are typically recomputed periodically. This is a computation-intensive process which undermines the effectiveness of the histogram and the performance of the database system. The histogram maintenance techniques of the invention minimize the need for periodic recomputation, while preserving the estimation advantages generally associated with histograms.

Various concepts related to histograms will now be defined. Let X be an attribute in relation R. The domain D of X is the set of all possible values of X and the finite value set V($\subseteq$D) is the set of values of X that are actually present in relation R. Let V={$v_i$:1$\leq i \leq$D}, where $v_i < v_j$ when i<j. The frequency $f_i$ of $v_i$ is the number of tuples t in R with t.X=$v_i$. The data distribution of X in R is the set of pairs {($v_1$, $f_1$), ($v_2$, $f_2$), . . . , ($v_D$, $f_D$)}. A histogram on attribute X is constructed by partitioning the data distribution into $\beta(\geq 1)$ mutually disjoint subsets called "buckets" and approximating the frequencies and values in each bucket in some common fashion. Typically, the bucket is assumed to contain either all possible values between the largest and smallest values in that bucket, referred to as its "range." This is the so-called continuous value assumption, as described in the above-cited P. Selinger et al. reference. Alternatively, the bucket may be assumed to include N equi-distant values in the range, where N is actual number of values in the bucket. This is known as the uniform spread assumption, as described in greater detail in V. Poosala, Y. Ioannidis, P. Haas and E. Shekita, "Improved histograms for selectivity estimation of range predicates," Proc. of ACM SIGMOD Conf., pp. 294–305, June 1996, which is incorporated by reference herein. In most histograms, the frequencies $f_i$ are approximated by their averages.

The accuracy of a given approximation depends on the grouping of attribute values into buckets, which is usually determined in accordance with a partitioning rule that seeks to effectively approximate the data distribution. Different classes of histograms can be obtained by using different partitioning rules. For example, two exemplary classes of histograms are equi-width and equi-depth histograms. Both these histograms group contiguous ranges of attribute values into buckets but differ in the partitioning rule employed, as follows. In an equi-width histogram, the "widths" of all buckets are the same, while in an equi-depth histogram, the total number of tuples having the attribute values associated with each bucket is the same. Equi-depth histograms may also be referred to as equi-height histograms.

Another important class of histograms is compressed(V,F) histograms, which will also be referred to herein simply as compressed histograms. In a compressed histogram, the n highest frequencies $f_i$ are stored separately in n singleton buckets, and the remaining frequencies are partitioned as in an equi-depth histogram. The value of n may adapt to the data distribution to ensure that no singleton bucket can fit within an equi-depth bucket and yet no single value spans an equi-depth bucket. It has been shown in the above-cited V. Poosala, Y. Ioannidis, P. Haas and E. Shekita reference that compressed histograms are very effective in capturing distributions with low as well as high skews. Equi-depth histograms are presently used in one form or another in nearly all commercial database systems, except for DB2 systems which use the more accurate compressed histograms. The histogram maintenance techniques of the invention will be illustrated herein using equi-depth and compressed histograms, but it should be understood that the disclosed techniques are also applicable to other types of histograms.

Histograms are typically generated by computing a data distribution, sorting it based on attribute value order, and then computing a histogram of the desired class from the data distribution. For large relations, computing and using the data distribution can be prohibitively expensive. It is therefore often desirable to obtain a relatively small random sample of the attribute data and use its data distribution, after scaling the frequencies up to the actual relation size, in the above-described histogram generation process. A suitable random sample may be obtained, for example, using a reservoir sampling technique such as that described in J. S. Vitter, "Random Sampling with a Reservoir," ACM Transactions on Mathematical Software, Vol. 11, No. 1, pp. 37–57, March 1985, which is incorporated by reference herein. Alternatively, a backing sample as described in the above-cited U.S. Patent Application may be used as the random sample.

In order to compute the approximate data distribution captured by a histogram making the above-noted continuous value assumption, it is sufficient to store the lowest and highest values grouped into each bucket, and the number of elements in each bucket. For histograms which group contiguous attribute values into buckets, such as both equi-depth and compressed histograms, additional storage space can be saved by storing only the highest value in each bucket. As noted above, the invention will be described using equi-depth and compressed histograms which make use of the continuous value assumption. Although the uniform-spread assumption has been shown to be more effective in estimating the result sizes of range predicates, it generally requires maintaining the number of distinct values in each bucket.

Approximate histograms in accordance with the invention will now be described in greater detail. Let H be the class C histogram, or simply C-histogram, where C denotes equi-depth or compressed, on the current contents of attribute X. When the contents of X are modified, the accuracy of H is affected in two ways. First, H may no longer be the correct C-histogram on the updated data. This is referred to as a class error. Second, H may contain inaccurate information about X. This is referred to as a distribution error. For a given attribute, an approximate C-histogram provides an approximation to the actual C-histogram for the relation. The quality of the approximation can be evaluated according to various error metrics defined based on the class and distribution errors.

The invention provides incremental histogram maintenance techniques, which can maintain approximate histograms within specified errors bounds at all times with high probability without the need to access the underlying relations for this purpose. A general framework for maintaining an approximate histogram will be described that performs a number of program instructions in response to each update to the database, and detects when the histogram is in need of an adjustment of one or more of its bucket boundaries. Such adjustments make use of a random sample of the underlying relation. To further reduce the overhead associated with the incremental maintenance approach of the invention, the program instructions mentioned above may be performed only for a random sample of the database updates.

Figure 4:
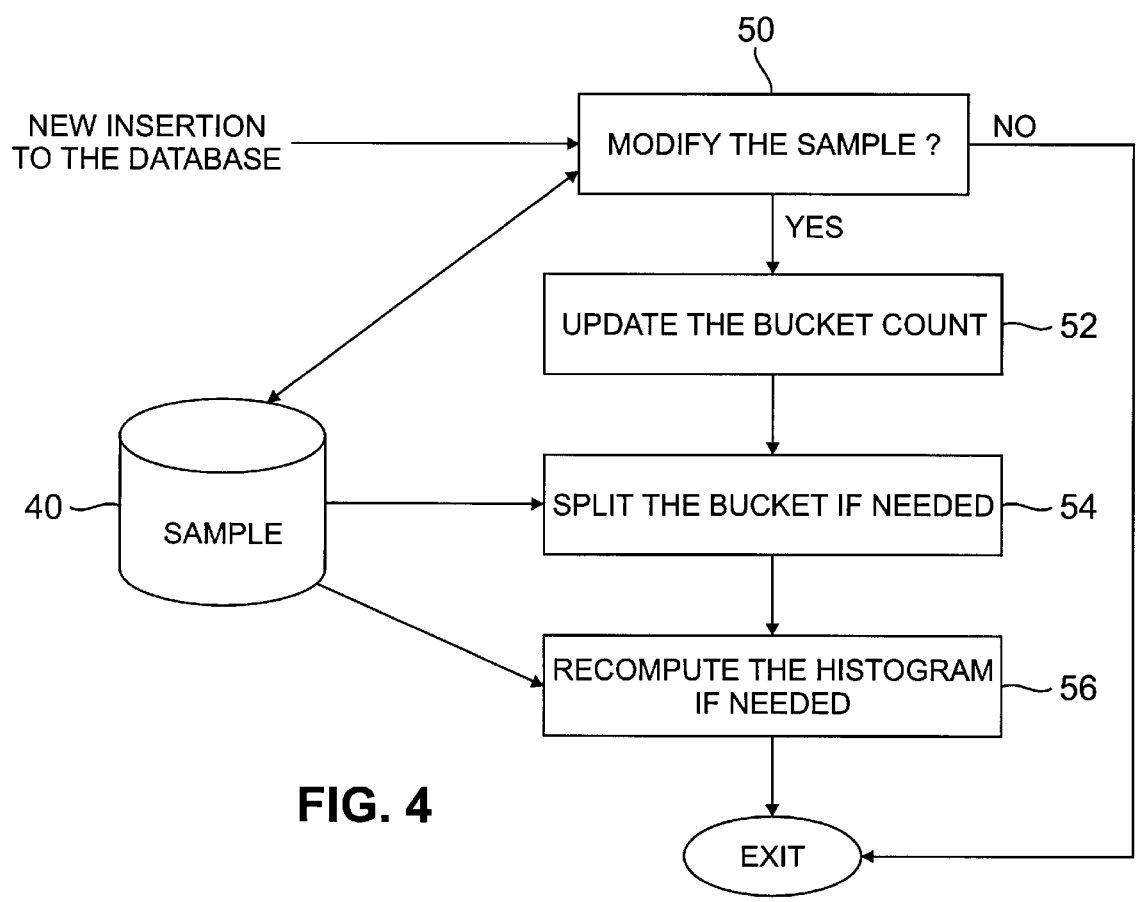
FIG. 4 is a flow diagram illustrating the general framework of a histogram maintenance process in accordance with the invention.

FIG. 4 is a diagram illustrating an exemplary histogram maintenance process in accordance with the invention. The histogram maintenance process makes use of a random sample 40, which as previously noted may be generated using a reservoir sampling technique, a backing sample technique, or other suitable random sample generation technique. The sample 40 may correspond to backing sample 19 stored in secondary memory 16 in FIG. 2. The diagram of FIG. 4 illustrates histogram maintenance in the presence of an update in the form of an insertion to a database. It will be shown below that the general process for maintaining a histogram in the presence of insertions can be readily extended to cover other database update operations including delete and modify operations. In step 50 of FIG. 4, after a new value is inserted into a relation of a database, a determination is made as to whether or not it is necessary to modify the sample 40. This determination may involve the use of random sampling techniques such as those described in the above-cited Vitter reference and U.S. Patent Application. If it is determined in step 50 that it is not necessary to modify the sample 40, the process ends for the given insertion. If the insertion makes it necessary to modify the sample 40, the process moves to step 52 to update the bucket count to reflect the new insertion. Step 54 then determines whether it is necessary to split the bucket which receives the value associated with the new insertion, and if so splits the bucket. The histogram is then recomputed if necessary in step 56, and the process ends for the given insertion. The conditions used to determine whether the bucket needs to split in step 54 and whether the histogram needs to be recomputed in step 56 will be illustrated in conjunction with specific examples given below for equi-depth and compressed histograms.

The following pseudocode provides an example of the general framework of FIG. 4 for incrementally maintaining a histogram when a new value is inserted in a relation.

```
Incremental_Maintenance_Framework(v)
    // v is the attribute value of the new element.
    // H is the ordered set of buckets in the current histogram.
    if v selected to be in the sample then
        Update_Sample(v);
        Determine the bucket B in H for v;
        BucketStats := Update_Stats(BucketStats, v);
    if Time_To_Rebucket(BucketStats) then
        H := Rebucket_Using_Sample(H);
    end;
```

For each bucket B in the histogram H, the algorithm maintains various statistics BucketStats, such as the number of elements and the highest sort value in the bucket. For effective use of this framework, elements should be selected for the random sample with low probability and the criterion for deciding to adjust one or more bucket boundaries should guarantee that this "rebucketing" process is infrequent. Moreover, the procedures for updating the bucket stats (Update_Stats) and deciding whether to rebucket (Time_To_Rebucket) should be computationally efficient.

The above-described general framework will be illustrated in greater detail below, first for equi-depth histograms and then for compressed histograms. It will be assumed throughout that a random sample S is available. A relation R is assumed to have an a priori unknown size N. An exact equi-depth histogram with $\beta$ buckets includes (1) a set of $\beta$-1 bucket boundaries, called "quantiles" that partition the domain of attribute values into $\beta$ intervals or buckets, and (2) a set of $\beta$ counts of the number of elements in each bucket. All buckets have either $\lfloor N/\beta \rfloor$ or $\lceil N/\beta \rceil$ elements. A well-known conventional algorithm for construction of exact equi-depth histograms first sorts the elements in the relation by attribute value, and then selects every $\lfloor N/\beta \rfloor$'th element. However, for large relations, this algorithm is quite slow. For example, if the relation is too large to fit in main memory, the sorting involves multiple input/output scans of the relation. A conventional approximate equi-depth histogram approximates the exact histogram by relaxing the requirement on the number of elements in a bucket and/or the accuracy of the counts. Such histograms can be evaluated based on how close the buckets are to $N/\beta$ elements and how close the counts are to the actual number of elements in their respective buckets. Given a random sample S, an approximate equi-depth histogram can be computed using well-known techniques, such as those described in the above-cited V. Poosala, Y. Ioannidis, P. Haas and E. Shekita reference. The following algorithm is a conventional technique for computing an approximate equi-depth histogram from a random sample, and will be used as a component of a histogram maintenance process in accordance with the invention.

```
Compute_Approximate_Equi-Depth_Histogram_from_Sample();
    // S is the sorted random sample to be used to compute the histogram.
    // N is the total number of elements in R.
    // β is the desired number of buckets.
for i := 1 to β do begin
    u := the value of element
        ⌊i · |S|/β⌋ in S;
    $B_i$.maxval := u;
    $B_i$.count := ⌈N/β⌉;
end;
return({$B_1,B_2, \ldots B_\beta$});
```

Given the random sample S, a conventional approximate equi-depth histogram can be computed at any time using the above procedure. A conventional approach to maintaining the approximate histogram in the presence of database updates might involve invoking the above procedure whenever the sample S is modified. However, the overhead associated with this conventional approach will be prohibitively large in many applications. The invention avoids this problem by providing techniques that can maintain an approximate histogram while only very rarely accessing the sample to perform a full recomputation.

An illustrative embodiment of the invention is a histogram maintenance process which monitors the accuracy of an approximate histogram, and performs partial recomputation only when the approximation error exceeds a pre-specified tolerance parameter. The process operates in phases. A given phase begins by re-computing the approximate equi-depth histogram from the sample, using the conventional algorithm given above. At each phase, a threshold $T=(2+\gamma)N'/\beta$ is maintained, where N' is the number of elements in the relation at the beginning of the phase, and $\gamma>-1$ is a tunable performance parameter. The threshold T is set at the beginning of each phase. The number of elements in any given bucket is maintained below the threshold T. As new tuples are added to the relation, the counts of the appropriate buckets are incremented. When a count exceeds the threshold T, the entire equi-depth histogram is recomputed from the sample S, and a new phase is started. Alternatively, it is possible to keep track of the difference between the maximum and minimum bucket counts, and recompute whenever this difference exceeds a threshold. The following pseudocode illustrates this maintenance process for approximate equi-depth histograms, in the presence of insertions to the relation.

```
Maintain_Approximate_Equi-Depth_Histogram()
    // R is the relation, X is the attribute of interest.
    // H is the ordered set of β buckets in the current histogram.
    // T is the current upper bound threshold on a bucket count.
    // γ > -1 is a tunable performance parameter.
After an insert of a tuple τ with τ.A = ν into R:
Determine the bucket B in H whose interval contains ν;
B.count := B.count + 1;
if B.count = T then do begin
```

```
    H :=
        Compute_Approximate_Equi-depth_Histogram_from_Sample();
    T := (2 + γ) · |R|/β;
end;
```

The cost of the above process in terms of computation overhead will now be described. Consider the cost of the calls to the approximate histogram computation procedure, for computing a histogram from the random sample S. This cost is dominated by the cost of reading from secondary memory a relation of size |S|, in order to extract the β sample quantiles. This procedure is called at the beginning of each phase. If the relation size is N at the beginning of the phase, then the number of insertions before the phase ends is at least $(1+\gamma)N/\beta$. Also, the relation size at the end of the phase is at least $\alpha N$ where $\alpha=(1+(1+\gamma)/\beta)$. It can be shown that if a total of N elements are inserted in the relation, then the total number of recomputations is at most min ($\log_\beta N$, N). A modification for possible performance enhancement is to maintain the quantiles for the sample in consecutive disk locations, so that the entire sample need not be read from secondary memory.

The above-described maintenance process will now be modified in order to reduce the number of recomputations. The modification involves balancing the buckets using a computationally-inexpensive procedure, before resorting to the more expensive procedure of recomputation. In accordance with the invention, when a given bucket count reaches the threshold T, the bucket is split in half instead of recomputing the entire histogram from the random sample. In order to maintain a fixed number β of buckets, two adjacent buckets whose total count does not exceed T are merged, if such a pair of buckets can be found. Only when a merge is not possible is the histogram recomputed from the sample. A phase is defined as the sequence of operations between consecutive recomputations.

Figure 5:
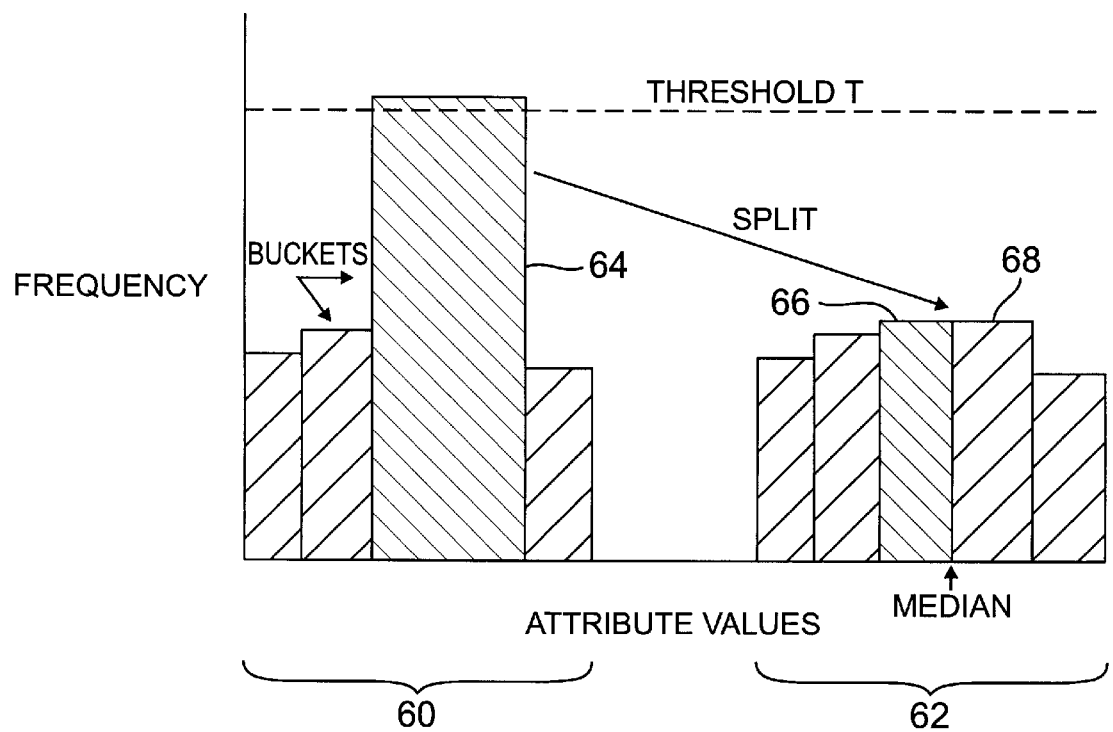
FIG. 5 illustrates a split operation of the histogram maintenance process of FIG. 4.

FIG. 5 illustrates the above-described split operation during equi-depth histogram maintenance in accordance with the invention. FIG. 5 shows the frequency of attribute values for a set of buckets 60 before the split and for the resulting set of buckets 62 after the split. Before the split, one of the buckets 64 in the set 60 has a total count which exceeds the threshold T. The bucket 64 is therefore split into two buckets 66 and 68 in the post-split set of buckets 62. The sample S is used to determine an approximate median value in the bucket 64 which is used as the bucket boundary between the two new buckets 66 and 68. The split operation is illustrated in greater detail in the following pseudocode. The operation of merging two adjacent buckets involves adding the counts of the two buckets and disposing of the boundary or quantile between them. It should be noted that the split and merge operations can occur only for $\gamma>0$ in this example.

```
Maintain_Approximate_Equi-Depth_Histogram_Using_Split&Merge()
    // R is the relation, X is the attribute of interest.
    // H is the ordered set of β buckets in the current histogram.
    // T is the current upper bound threshold on a bucket count.
    // γ > -1 is a tunable performance parameter.
After an insert of a tuple τ with τ.A = ν into R:
Determine the bucket B in H whose interval contains ν;
B.count := B.count + 1;
if B.count = T then do begin
    if ∃ buckets $B_i$ and $B_{i+1}$ such that $B_i$.count + $B_{i+1}$.count < T then do begin
        // Merge buckets $B_i$ and $B_{i+1}$.
```

```
        B_i.count := B_i.count + B_{i+1}.count;
        // Split bucket B using the sample S; use B_i for the first half of B's elements.
        m := median value among all elements in S associated with bucket B.
        B_i.maxval := m;
        B_i.count := T/2;
        B.count := T/2;
        Reshuffle equi-depth buckets in H back into sorted order;
    end;
    else do begin
        // No buckets suitable for merging, so recompute the histogram from S.
        H := Compute_Approximate_Equi-depth_Histogram from_Sample();
        T := (2 + γ) · |R|/β;
    end;
end;
```

The parameter γ is a tolerance parameter which determines how often a recomputation occurs. For example, in the extreme case in which γ is approximately −1, the split and merge process recomputes the histogram with each database update, i.e., there are on the order of |R| phases. At the other extreme, if γ>|R|, the process will always use the original buckets and will not employ any balancing operation. Thus, the setting of the performance parameter γ gives a spectrum of processes, from the most computationally efficient process which provides relatively poor accuracy, to the most accurate algorithm which has a relatively poor efficiency. Selecting a suitable intermediate value for γ provides a process with good performance, both in accuracy as well as in efficiency. For instance, setting γ=1 will result in a process with an imbalance factor bounded by about 3, and a number of phases on the order of log N. In most practical applications, a value of γ between about 0.5 and 1 will provide acceptable performance, although other embodiments may of course utilize other values of γ. It can be shown that if γ is less than or equal to 2, the number of splits that can occur in a given phase of the process is at most β. Moreover, if α is 1+γ/2 for γ>1 and (1+(1+γ)/β) otherwise, it can be shown that if a total of N elements are inserted in the relation, then the total number of recomputations is at most min (log_α N, N).

The above-described split and merge maintenance process for approximate equi-depth histograms will now be extended to handle delete operations and modify operations. Deletions can decrease the number of elements in a bucket relative to other buckets, so an additional threshold $T_l$ that serves as a lower bound on the count in a bucket. After each recomputation, $T_l$ is set equal to |R|/(β(2+γ_l)), where γ_l>−1 is a tunable parameter. The threshold T is set as previously described. Consider a deletion of a tuple τ with τ.A=v from relation R. Let B be the bucket in the histogram H whose interval contains value v. The bucket count B.count is decremented, and if B.count=γ_l, H is recomputed from the sample S, and both T and $T_l$ are updated. If B.count=$T_l$, the bucket B is merged with one of its adjacent buckets and the bucket B' with the largest count is split, as long as B'.count≧2 ($T_l$+1). Note that B' may or may not be the newly merged bucket. If no such B' exists, then histogram H is recomputed from the sample S.

A modify operation which does not change the value of attribute X, or one which changes the value of X such that the old value is in the same bucket as the new value, does not alter the histogram H, so there is no need to alter it for these types of modify operations. Other types of modify operations can be handled by treating the modify operation as a delete followed by an insert. It should be noted that the presence of delete and modify operations generally does not affect the accuracy of the histogram computed from the sample S. Moreover, upper and lower thresholds on the sample S may be used to control the imbalance among buckets between recomputations, so that the histograms remain highly accurate. If the sequence of updates to relation R is such that |R| increases at a steady rate, then the number of recomputations can be bounded by a constant factor times the bound given above, where the constant depends on the rate of increase.

Embodiments of the invention for maintaining approximate compressed histograms will now be described in detail. As in the above description relating to equi-depth histograms, a conventional approximate compressed histogram generation process will be described first, then a compressed histogram maintenance process in accordance with the invention for handling insertions will be described, followed by a split and merge process to minimize recomputations, and finally extensions to handle delete and modify operations. It is again assumed that a random sample S of a relation R is available. As noted above, a compressed histogram stores the n highest frequencies $f_i$ in n separate singleton buckets, and partitions the remaining frequencies as in an equi-depth histogram. Assume that the compressed histogram includes β buckets, with β' equi-depth buckets and β−β' singleton buckets, where 1≦β'≦β, such that: (1) each equi-depth bucket has ⌊N'/β'⌋ or ⌈N'/β'⌉ elements, where N' is the total number of elements in equi-depth buckets; (2) no single value spans an equi-depth bucket, i.e., the set of bucket boundaries are distinct, and conversely, (3) the value in each singleton bucket has frequency ≧N'/β'. Associated with each bucket B is a maximum value B.maxval, which is either the singleton value or the bucket boundary, and a count B.count. An approximate compressed histogram approximates the exact histogram by relaxing one or more of the above three requirements and/or the accuracy of the counts. The following pseudocode illustrates a conventional process for generating an approximate compressed histogram. This conventional process will then be incorporated into an embodiment of the invention for providing incremental maintenance of an approximate compressed histogram.

Compute_Approximate_Compressed_Histogram_from_Sample()
    // S is the random sample of R used to compute the histogram.

-continued

```
// β is the desired number of buckets.
// Compute the scaling factor for the bucket counts, and initialize β' and m'.
γ := |R|/|S|; β' := β; m' := |S|;
For each value v in S compute f_v^S, the frequency of v in S;
Let v_1, v_2, . . . v_{β-1} be the β-1 most frequent values in non-increasing order;
For i := 1 to β - 1 while f_v^S ≧ B'/m' do begin
        // Create a singleton bucket for v_i.
        β_{β'}.maxval := v_i; B_{β'}.count := λ · f_v^S;
        m' := m' - f_v^S; β' := β' - 1;
end;
Let S' be the elements in S whose values are not in singleton buckets, sorted by value;
// Create β' equi-depth buckets from S'.
For i := 1 to β' do begin
        u := the value of element i · S'/β' in S';
        B_i.maxval := u; B_i.count := λ · m'/β';
end;
return({B_1, B_2, . . . B_{β'}}, λ · m', β');
```

Each value v with frequency $f_v$ is expected to occur $f_v|S|/N$ times in a sample S. Thus, values belonging in singleton buckets (i.e., $f_v \geq N/\beta$) can be expected to occur at least $|S|/\beta$ times in S. For a high confidence result, the sample S should therefore be of at least size $c\beta \ln\beta$, for a suitably large constant c. This ensures that values belonging in singleton buckets will be well-represented in the sample, with high probability.

The equi-depth histogram maintenance process given above may be modified to provide compressed histogram maintenance in the presence of inserts to a database relation. On an insert of a tuple with value v into the relation, the singleton or equi-depth bucket B for v is determined, and the count is incremented. If B is an equi-depth bucket, then as in the above equi-depth histogram maintenance process, a check is made to determine if the count of B now equals the threshold T for splitting a bucket, and if it does, the histogram is updated. In the equi-depth maintenance process, the histogram was updated by (1) finding two adjacent equi-depth buckets that can be merged without violating the threshold T, (2) merging these two buckets, and (3) splitting B in two at its approximate median value, as determined by the sample. If no such buckets exist for step (1), the entire histogram is recomputed from the sample. The process steps for compressed histograms are similar, but should account for the following:

1. New values added to the relation may be skewed, so that values that did not warrant singleton buckets before may now belong in singleton buckets.
2. The threshold for singleton buckets grows with N', the number of elements in equi-depth buckets. Thus values rightfully in singleton buckets for smaller N' may no longer belong in singleton buckets as N' increases.
3. Because of items 1 and 2 above, the number β' of equi-depth buckets grows and shrinks, and hence the equi-depth buckets should be adjusted accordingly.
4. Similarly, the number of elements in equi-depth buckets grows and shrinks dramatically as sets of elements are removed from and added to singleton buckets. The ideal is to maintain N'/β' elements per equi-depth bucket, but both N' and β' are growing and shrinking.

The compressed histogram maintenance techniques of the invention address each of the above items. The techniques address item 1 by using the fact that a large number of updates to the same value v will suitably increase the count of the equi-depth bucket containing v so as to cause a bucket split. Whenever a bucket is split, if doing so creates adjacent bucket boundaries with the same value v, then a new singleton bucket is created for v. Item 2 is addressed by allowing equi-depth buckets with relatively small counts to be merged back into the equi-depth buckets. Items 3 and 4 are addressed using procedures for splitting and merging buckets to grow and shrink the number of buckets, while maintaining approximate equi-depth buckets, until the histogram is recomputed. The imbalance between the equi-depth buckets is controlled by the thresholds T and $T_l$. When an equi-depth bucket is converted into a singleton bucket or vice-versa, the procedures can ensure that at that time, the bucket is within a constant factor, dependent on the parameters $\gamma$ and $\gamma_l$, of the average number of elements in an equi-depth bucket. Thus the average is roughly maintained as such equi-depth buckets are added or subtracted.

A set of pseudocode is given below to illustrate these compressed histogram maintenance techniques. The pseudocode uses the following definitions. A pair of buckets, $B_i$ and $B_j$, is a candidate merge pair if (1) $B_i$ and $B_j$ are adjacent equi-depth buckets or a singleton bucket and the equi-depth bucket in which the singleton value belongs, and (2) $B_i$.count and $B_j$.count<T. A bucket B is a candidate split bucket if it is an equi-depth bucket with B.count$\geq 2(T_l+1)$ or a singleton bucket such that $T/(2+\gamma) \geq$ B.count $\geq 2(T_l+1)$. When there is more than one candidate merge pair or candidate split bucket, the maintenance process selects the one with the smallest combined bucket count or largest bucket count, respectively.

```
Maintain_Approximate_Compressed_Histogram_Using_Split&Merge()
    // R is the relation, A is the attribute of interest, S is the sample.
    // H is the set of β' ≧ 1 equi-depth buckets sorted by value and β-β' singleton buckets
    // in the current histogram.
    // T is the current threshold for splitting an equi-depth bucket.
    // T_1 is the current threshold for merging a bucket.
    // γ > -1 and γ_1 > -1 are tunable performance parameters.
    After an insert of a tuple τ with τ.A = v into R:
```

-continued

```
Determine the bucket B in H whose interval contains v;
B.count := B.count + 1;
if B is an equi-depth bucket and B.count = T then
Split_Bucket(B);
end;
```

```
SplitBucket(B)
     // This procedure either splits bucket B or recomputes H from S.
m := median value among all elements in S associated with bucket B.
Let B_p be the bucket preceding B among the equi-depth buckets.
if m ≠ B_p.maxval and m ≠ B.maxval then
     if ∃ buckets B_i and B_j that are a candidate merge pair then do begin
               B_j.count := B_i.count + B_j.count; // Merge B_i into R_j.
               B_i.maxval := m; B_i.count := T/2; B.count := T/2; // Split B.
     end;
     else do begin  // No suitable merge pair, so recompute H from S.
          (H, N', β') := Compute_Approximate_Compressed_Histogram_from_Sample();
          T := (2 + γ) · N'/β'; T_1 := N'/((2 + γ_1)β'); // Update thresholds.
     end;
     else if m = B_p.maxval then do begin // Create a singleton bucket for the value m.
     B_p.count := B_p.count + B.count − f_m^S · |R|/|S|; // First use B for B ∪ B_p − m.
     B_p.maxval := m; B_p.count := f_m^S · |R|/|S| // Then use B_p for m.
     if B.count ≥ T then // The merged bucket (without m) is too big.
               Split_Bucket(B);
     else if B.count ≤ T_1 then do begin // The merged bucket (without m) is too small.
     if ∃ buckets B_i and B_j that are a candidate merge pair such that B = B_i
     or B = B_j and ∃ bucket B_s that is a candidate split bucket then
               B_j.count := B_i.count + B_j. count; Split_Bucket(B_s); // Merge and split.
     else do begin
          (H, N', β') := Compute_Approximate_Compressed_Histogram_from_Sample();
          T := (2 + γ) · N'/β'; T_1 := N'/((2 + γ_1)β'); // Update thresholds.
     end;
     else if m = B.maxval then . . .
          // This case is similar to the previous case, focusing on B and the bucket after it.
end;
```

The above pseudocode illustrates a process which maintains an approximate compressed histogram in the presence of insertions to a database relation. It can be shown that the illustrative process can provide the following invariants: (1) for all buckets B, B.count>$T_l$; (2) for all equi-depth buckets B, B.count<T; (3) all bucket boundaries B.maxval are distinct; and (4) any value v belongs to either one singleton bucket, one equi-depth bucket or two adjacent equi-depth buckets. In the latter case, any subsequent inserts or deletes are targeted to the first of the two adjacent buckets. Thus the set of equi-depth buckets have counts that are within a factor $T/T_l=(2+\gamma)(2+\gamma_l)$, which is a small constant independent of $|R|$.

Extensions of the above histogram maintenance process to handle delete and modify operations will now be described. Deletions can decrease the number of elements in a bucket relative to other buckets, resulting in a singleton bucket that should be converted to an equi-depth bucket or vice-versa. A deletion can also drop a bucket count to the lower threshold $T_l$. Consider a deletion of a tuple τ with τ.A=v from R. Let B be the bucket in the histogram H whose interval contains v. First, B.count is decremented. If B.count=$T_l$, the following operations are performed. If B is part of some candidate merge pair, the pair is merged with the smallest combined count and then the candidate split bucket B' with the largest count is split. Note that B' may or may not be the newly merged bucket. If no such B' exists, then H is recomputed from the sample S. Similarly, if B is not part of some candidate merge pair, H is recomputed from S. As in the insertion-only case, the conversion of buckets from singleton to equi-depth and vice-versa is primarily handled by detecting the need for such conversions when splitting or merging buckets.

For modify operations, as in the above-described equi-depth case, if the modify operation does not change the value of attribute A, or it changes the value of A such that the old value is in the same bucket as the new value, then H remains unchanged. Otherwise, H is updated by treating the modify as a delete followed by an insert. The invariants given above for the compressed histogram in the presence of inserts also hold in the presence of these extensions to handle delete and modify operations.

The invention provides techniques for keeping approximate histograms up-to-date in the presence of updates to a database. This type of histogram maintenance is of critical importance for query optimizers and other components of database management systems that rely on estimates requiring information about the current data. Exemplary procedures were described above for maintaining the widely-used class of equi-depth histograms and the highly-accurate class of compressed histograms. The split and merge aspects of these procedures drastically reduce accesses to a disk or other secondary memory for a sample of a relation. Very few recomputations are incurred for a large number of database updates, indicating that the split and merge techniques are effective in minimizing overhead due to recomputation. With a relatively small amount of additional storage and processor resources, these techniques can maintain histograms nearly up-to-date at all times. The invention is particularly efficient in insert-intensive environments, in data warehousing environments that house transactional information for sliding time windows, and in numerous other practical database management applications.

The above-described embodiments of the invention are intended to be illustrative only. Numerous alternative embodiments within the scope of the following claims will be apparent to those skilled in the art.

What is claimed is:

1. A method of maintaining a histogram for at least one attribute of a relation in a database, the histogram including a plurality of subsets each representing at least one possible value of the attribute, each of the subsets having a count associated therewith indicative of the frequency of occurrence of the corresponding value of the attribute, the method comprising the steps of:

comparing the counts associated with the subsets to a threshold after an update to the relation; and separating a given one of the subsets into at least two separate subsets if the count associated with the given subset exceeds the threshold after the update.

2. The method of claim 1 further including the step of merging at least two of the subsets to form a single subset after the separating step, such that the histogram maintains a fixed number of subsets, if there are two subsets with a total combined count which does not exceed the threshold.

3. The method of claim 2 further including the step of recomputing the histogram from a random sample of the relation if there are not two subsets with a total combined count which does not exceed the threshold.

4. The method of claim 1 wherein the separating step includes separating the given subset into two separate subsets at an approximate median of the given subset.

5. The method of claim 1 wherein the histogram is an approximate equi-depth histogram.

6. The method of claim 1 wherein the histogram is an approximate compressed histogram.

7. The method of claim 1 wherein the threshold is computed as $(2+\gamma)N/\beta$, where $\beta$ is the number of subsets, N is the number of values in the relation, and $\gamma$ is a tunable performance parameter which is greater than $-1$.

8. The method of claim 6 wherein $\gamma$ is selected between about 0.5 and 1.

9. The method of claim 1 wherein the threshold is recomputed each time the histogram is recomputed from a random sample of the relation.

10. The method of claim 1 further including the step of comparing the counts of the subsets to a second threshold after an update to the relation, the second threshold representing a lower bound on the count of a subset.

11. The method of claim 10 wherein the second threshold is generated as $N/(\beta(2+\gamma_l))$, where $\beta$ is the number of subsets, N is the number of values in the relation, and $\gamma_l$ is a tunable performance parameter which is greater than $-1$.

12. The method of claim 10 wherein the second threshold is recomputed each time the histogram is recomputed from a random sample of the relation.

13. The method of claim 10 further including the steps of:

merging a given subset having a count less than or equal to the second threshold with another subset adjacent to the given subset;

separating the subset having the largest count such that the number of subsets is maintained at a fixed number after the merging step, if the count of the subset with the largest count is at least twice the second threshold; and recomputing the histogram from a sample of the relation if the count of the subset with the largest count is not at least twice the second threshold.

14. An apparatus for use in maintaining a histogram for at least one attribute of a relation in a database, the apparatus comprising:

a memory for storing the histogram, the histogram including a plurality of subsets each representing at least one possible value of the attribute, with each of the subsets having a count associated therewith indicative of the frequency of occurrence of the corresponding value of the attribute; and a processor coupled to the memory and operative to compare the counts associated with the subsets to a threshold after an update to the relation, and to separate a given one of the subsets into at least two separate subsets if the count associated with the given subset exceeds the threshold after the update.

15. The apparatus of claim 14 wherein the processor is further operative to merge at least two of the subsets to form a single subset, such that the histogram maintains a fixed number of subsets after the separation, if there are two subsets with a total combined count which does not exceed the threshold.

16. The apparatus of claim 15 wherein the processor is further operative to recompute the histogram from a random sample of the relation if there are not two subsets with a total combined count which does not exceed the threshold.

17. The apparatus of claim 14 wherein the processor is further operative to separate the given subset into two separate subsets at an approximate median of the given subset.

18. The apparatus of claim 14 wherein the histogram is an approximate equi-depth histogram.

19. The apparatus of claim 14 wherein the histogram is an approximate compressed histogram.

20. The apparatus of claim 14 wherein the processor is further operative to compute the threshold as $(2+\gamma)N/\beta$, where $\beta$ is the number of subsets, N is the number of values in the relation, and $\gamma$ is a tunable performance parameter which is greater than $-1$.

21. The apparatus of claim 20 wherein $\gamma$ is selected between about 0.5 and 1.

22. The apparatus of claim 14 wherein the processor is further operative to recompute the threshold each time the histogram is recomputed from a random sample of the relation.

23. The apparatus of claim 14 wherein the processor is further operative to compare the counts of the subsets to a second threshold after an update to the relation, the second threshold representing a lower bound on the count of a subset.

24. The apparatus of claim 23 wherein the processor is further operative to compute the second threshold as $N/(\beta(2+\gamma_l))$, where $\beta$ is the number of subsets, N is the number of values in the relation, and $\gamma_l$ is a tunable performance parameter which is greater than $-1$.

25. The apparatus of claim 23 wherein the processor is further operative to recompute the second threshold each time the histogram is recomputed from a random sample of the relation.

26. The apparatus of claim 23 wherein the processor is further operative to merge a given subset having a count less than or equal to the second threshold with another subset adjacent to the given subset, to separate the subset having the largest count such that the number of subsets is maintained at a fixed number after the merging step, if the count of the subset with the largest count is at least twice the second threshold, and to recompute the histogram from a sample of the relation if the count of the subset with the largest count is not at least twice the second threshold.

* * * * *